United States Patent [19]

Stapleton et al.

[11] Patent Number: 5,694,155
[45] Date of Patent: Dec. 2, 1997

[54] FLAT PANEL DISPLAY WITH EDGE CONTACTING IMAGE AREA AND METHOD OF MANUFACTURE THEREOF

[76] Inventors: Robert E. Stapleton, 1191 Colgate Dr., Monroeville, Pa. 15146; Denny Jaeger, 6120 Valley View Rd., Oakland, Calif. 94611

[21] Appl. No.: 429,233

[22] Filed: Apr. 25, 1995

[51] Int. Cl.⁶ .................................................. G09G 3/00
[52] U.S. Cl. .......................... 345/206; 345/204; 345/205
[58] Field of Search ............................... 345/204, 205, 345/206, 103, 903, 170

[56] References Cited

U.S. PATENT DOCUMENTS

| | | | |
|---|---|---|---|
| 3,765,747 | 10/1973 | Pankratz et al. | 346/206 |
| 3,862,360 | 1/1975 | Dill et al. | 345/205 |
| 3,883,887 | 5/1975 | Robinson, Sr. | 345/205 |
| 3,934,246 | 1/1976 | Mueller | 345/170 |
| 4,006,383 | 2/1977 | Luo et al. | 315/169 TV |
| 4,110,662 | 8/1978 | Greeneich et al. | 315/169 TV |
| 4,135,959 | 1/1979 | Luo et al. | 156/230 |
| 4,156,833 | 5/1979 | Wey et al. | 340/719 |
| 4,393,380 | 7/1983 | Hosokawa et al. | 345/206 |
| 4,479,112 | 10/1984 | Hirsch | 340/65 |
| 4,551,717 | 11/1985 | Dreher | 340/712 |
| 4,644,326 | 2/1987 | Lobos et al. | 340/365 |
| 4,654,649 | 3/1987 | Kojima et al. | 345/205 |
| 4,746,198 | 5/1988 | Baeger | 350/366 |
| 4,766,426 | 8/1988 | Hatada et al. | 345/206 |
| 4,818,991 | 4/1989 | Gay | 345/205 |
| 4,838,654 | 6/1989 | Hamaguchi et al. | 345/206 |
| 4,880,969 | 11/1989 | Lawrie | 250/221 |
| 4,980,774 | 12/1990 | Brody | 345/205 |
| 4,980,775 | 12/1990 | Brody | 345/205 |
| 4,982,272 | 1/1991 | Brody | 345/205 |
| 5,034,602 | 7/1991 | Garcia, Jr. et al. | 250/227.22 |
| 5,067,021 | 11/1991 | Brody | 358/241 |
| 5,079,636 | 1/1992 | Brody | 345/205 |
| 5,367,393 | 11/1994 | Ohara et al. | 359/67 |

Primary Examiner—Richard Hjerpe
Assistant Examiner—Joseph Acoste
Attorney, Agent, or Firm—Harris Zimmerman

[57] ABSTRACT

A flat panel display has an image area that extends to one or more of the edges of the display. The display has a multi-layered construction which includes a layer of x-coordinate busbars and a layer of y-coordinate busbars overlaying a substrate. A layer of optically active material responds to voltages applied to the busbars. The busbars and optically active material extend to one or more edges of the substrate. The driver circuit is connected to the busbars at one or more edges of the display through angled busbar extensions which overlap the the busbars and which extend for a short distance along the busbars. The extensions connect with driver circuitry located behind the image area. Portions of the busbar layers may be masked during depositing of overlaying layers to enable later formation of the busbar extensions or deposited material may be removed to expose portions of the busbars. Low cost production of displays can be realized by forming layers for a number of displays on a large substrate plate which is then sliced into smaller units along the zones at which portions of the busbars are exposed.

14 Claims, 11 Drawing Sheets

| Fig. 10A |
| Fig. 10B |
| Fig. 10C |
| Fig. 10D |

FLAT PANEL DISPLAY WITH EDGE CONTACTING IMAGE AREA AND METHOD OF MANUFACTURE THEREOF

TECHNICAL FIELD

This invention relates to electronic apparatus for displaying visible images and more particularly to flat panel displays and to the fabrication of such displays.

BACKGROUND OF THE INVENTION

Flat panel displays can have a much thinner configuration than the cathode ray tube type of image display that is commonly used in television sets, computer monitors and the like. Compactness also makes flat panel displays useful for purposes that cannot be served by the bulkier forms of electronic image display. For example, it is advantageous to embed small image displays in the keys or switch buttons which are used to control various kinds of apparatus. This enables labels or symbols on the keys or switch caps to be changed instantly when the function of the key is changed such as occurs in use of computer keyboards for example.

Flat panel displays of the type to which the present invention is applicable have a layered construction which includes a layer of optically active material overlaying a substrate plate. Conductive x-coordinate busbars extend across the image area in one direction and y-coordinate busbars extend in an orthogonal direction. Images are generated by applying voltage across particular pairs of of the x and y busbars to create localized electrical fields within the optically active material.

The image area of most prior flat panel displays is smaller than the total area of the face of the display. A sizable bezel region is present between the boundary of the image area and the actual edges of the display. The bezel region variously contains structural framing, control circuits, bus conductors and in some cases seals for retaining a liquid which forms the optically active layer. It is preferable in many usages and essential in some cases that the image area extend to one or more of the edges of the flat panel display. For example, small displays which are embedded in keyboard keys or switch caps as previously discussed can be no larger than the key or switch cap itself. A sizable bezel region on the face of a display of this kind further limits the size of the image. This can make displayed labels or symbols difficult to read or identify. Bezel regions also disrupt the image if a series of flat panel displays are disposed in side by side and/or end to end relationship for joint operation for the purpose of producing a large continuous single image.

It has heretofore been recognized that the bezel region can be eliminated and the image area can be made coextensive with the face of the display by situating the components which were formerly within the bezel at another location such as the back of the substrate layer and by extending the optically active layer, the busbars and other layers to the edges of the display. Thin conductors at the edges of the substrate connect the minute end surfaces of the busbars with their driver circuit at the back of the display.

Certain layers within a flat panel display of this kind, including the busbar layers, are typically very thin and are fabricated by photolithic techniques, metal deposition, etching and other procedures similar to those used in the manufacture of printed circuit boards and microchips. A large number of the minute busbars are present and are very closely spaced in order to provide a desirable degree of resolution in the images. The conductors at the edges of the substrate which connect the busbars with the control circuit are also minute, numerous and closely spaced. In a flat panel display which has an edge to edge image area, the busbars are buried by other layers of the display during fabrication of the multi-layered display if prior manufacturing processes are used. This does not provide enough contact area to assure that a good low resistance electrical connection of each busbar to the driver circuit can be effected with high reliability. In the absence of the present invention this can result in a failure of a high proportion of the displays due to the extreme difficulty of making good electrical connections at the minute end surfaces of the busbars. The problem is aggravated when greater image resolution is to be provided as this requires greater numbers of still more closely spaced busbars.

Fabrication of this type of flat panel display on a unit by unit basis is undesirably complicated, costly and time consuming particularly if the individual units are small. A process which enables concurrent manufacture of a plurality of displays of this type and which avoids the electrical connection problem discussed above would be highly advantageous.

The present invention is directed to overcoming one or more of the problems discussed above.

SUMMARY OF THE INVENTION

In one aspect, the present invention provides a flat panel display having a visible image area that extends to at least one edge of the display panel. The display includes a first layer of busbars on a first major surface of a substrate which busbars extend to at least one edge surface of the substrate. A second layer of busbars also extends to the edge surface and has busbars which are oriented to cross the busbars of the first layer. A layer of optically active material generates visible images in response to signals that are applied to the busbars by driver circuitry. A series of spaced apart busbar extensions at the edge surface of the substrate connect busbars of the first busbar layer with the driver circuitry. The busbar extensions extend away from the plane of the first major surface of the substrate at the edge surface of the substrate and have major surface overlapping angled first ends which wrap around the intersection of the edge surface and the major surface. The angled first ends extend for a distance along end portions of the busbars in electrical contact with the busbars and are bonded thereto.

In another aspect, the invention provides a switch cap having a flat panel display with an image area that extends to at least one edge of the cap. The switch cap has a first layer of busbars on a first major surface of a substrate and the busbars extend to the edge surface of the substrate. A second layer of busbars also extends to the edge surface and has busbars which are oriented to cross the busbars of the first layer. A layer of optically active material generates visible images in response to signals that are applied to the busbars by driver circuitry. Spaced apart busbar extensions at the edge surface of the substrate connect busbars of the first busbar layer with the driver circuitry. The busbar extensions extend away from the plane of the first major surface of the substrate at the edge surface thereof and have major surface overlapping angled first ends which wrap around the intersection of the edge surface and the major surface. The angled first ends extend for a distance along end portions of the busbars in electrical contact with the busbars and are bonded thereto.

In another aspect, the invention provides a method of fabricating a plurality of flat panel displays each of which has plural layers of material overlaying a first surface of a substrate. The layers include a layer of spaced apart conductive busbars which extend in an x-coordinate direction and a layer of y-coordinate busbars which extend in an orthogonal relationship with the x-coordinate busbars. Steps in the method include forming a first layer of busbars on a substrate plate that has an area at least equal to the combined areas of the substrates of the flat panel displays that are to be produced and depositing at least one additional layer of material over the first layer of busbars. At least one zone is provided at which portions of the busbars of the first busbar layer are exposed which zone extends across the first busbar layer. A first portion of the substrate plate and the layers thereon is divided from a second portion along a line which extends along the zone and which is spaced from both edges of the zone. This leaves exposed end portions of the busbars of the first busbar layer on both of the first and second portions of the substrate plate which end portions overlay the first surface of the substrate plate. Electrical connections to the busbars of the first busbar layer are provided by depositing conductive material on the exposed end portions of the busbars and on the edge surfaces of the substrate plate that have been newly created by the division of the substrate plate thereby forming angled busbar extensions which overlap the busbar end portions and which extend away from the plane of the first busbar layer at the newly created edge surfaces.

In still another aspect, the invention provides a method of fabricating a flat panel display which has an image display area that extends between opposite edges of the face of the display. The method includes the step of patterning a first layer of spaced apart conductive busbars to a first surface of a substrate including extending the conductors from one edge of the substrate to the opposite edge. At least one additional layer of material is deposited over the first busbar layer. End portions of the busbar conductors that overlay the first surface of the substrate and which are adjacent to the opposite edges of the substrate are masked during depositing of the additional layer of material. The end portions of the busbars are subsequently unmasked to expose the end portions. Connection of driver circuitry to the busbars is provided for by forming a series of busbar extensions which extend away from the plane of the first layer of busbars at least at one of the opposite edges of the substrate. The extensions are formed to have angled ends that overlap the end portions of the busbars.

The invention provides a flat panel display having a visible image display area that extends to one or more of the edges of the face of the display panel and which may, if necessary, be substantially coextensive with the face of the display panel. Displays embodying the invention may be manufactured in an economical manner with high assurance that electrical connections between the minute busbars and the control circuit are effective and reliable. Flat panel displays of this kind, including small displays suitable for embedding in keyboard keys, switch caps and the like, can be economically manufactured to provide high resolution images. In one aspect, the method of the invention further provides cost saving procedures for fabricating a plurality of the flat panel displays concurrently rather than than on a unit by unit basis.

The invention, together with further aspects and advantages thereof, may be further understood by reference to the following description of the preferred embodiments and by reference to the accompanying drawings.

DETAILED DESCRIPTION OF THE PREFERRED EMBODIMENTS

Figure 1:
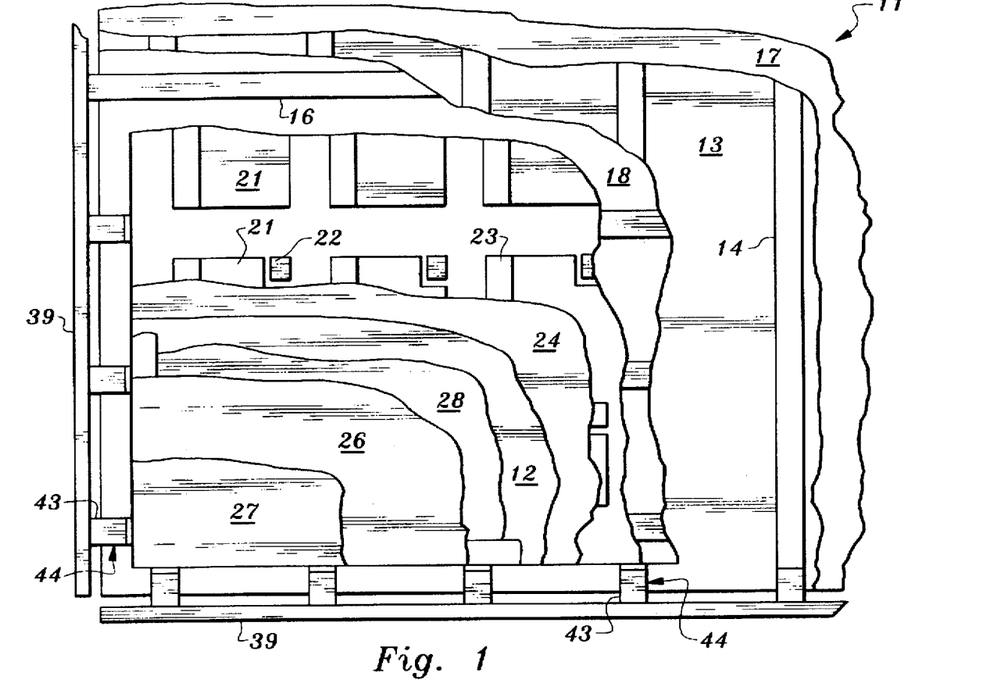
FIG. 1 is a broken out and enlarged plan view of a corner region of a flat panel display in accordance with a first embodiment of the invention.
Figure 2:
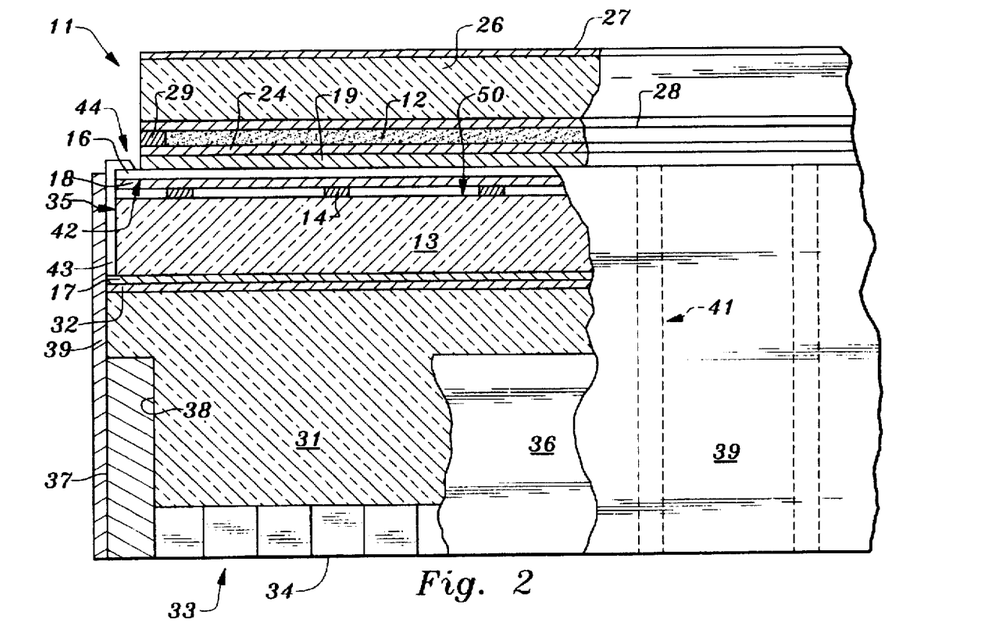
FIG. 2 is a broken out side view of the corner of the display that is depicted in FIG. 1.

Referring initially to FIGS. 1 and 2, the invention is applicable to flat panel displays 11 of the kind which have a multi-layered construction including a layer of optically active material 12 overlaying a substrate 13 and first and second layers of spaced apart, parallel, conductive busbars 14 and 16 respectively that extend in orthogonal directions. There are a variety of different types of flat panel display that are of this general form and it should be recognized that the invention is not limited to use in the specific types of display that are shown in the drawings for purpose of example.

The particular example of the invention that is shown in FIGS. 1 and 2 is an active matrix liquid crystal flat panel display and thus the first and second layers of busbars 14 and 16 are both situated on top of the substrate 13 and underneath the optically active liquid crystal layer 12. Additional layers which are present in a display of this specific type include a back polarizer 17 which is bonded to the back of the substrate 13 and a first insulation layer 18 situated between the first and second layers of busbars 14 and 16. The matrix includes a layer 19 which forms an array of minute conductive pads 21 and an array of thin film transistors 22 and an array of charge storage capacitors 23. Layer 19 overlays the first insulation layer 18 and is itself overlaid by a second layer of insulation 24 which is situated immediately behind the liquid crystal layer 12. A cover plate 26 overlays the liquid crystal 12 and has a front polarizer layer 27 bonded to its front face and conductive back plane layer 28 bonded to its back surface. Thin edge seals 29 extend between the edges of the cover plate 26 and insulation layer 24 to retain the liquid crystal 12 in place and to provide structural support for the cover plate.

Back plane layer 28 and the pads 21 and capacitors 23 of layer 19 are thin films formed of transparent conductor material such as indium tin oxide, for example. Busbars 14 and 16 may be formed of the same material. Insulation layers 18 and Substrate 13 and cover plate 27 are also transparent and may, for example, be formed of glass.

The display 11 of FIGS. 1 and 2 forms the face of a keyboard key or switch button, as will hereinafter be described in more detail, in order to enable display of changeable labels at the key or switch button when the function of the key or switch is changed. In this example of the invention, a transparent support block 31 is bonded to the back of substrate 13 such as by a layer 32 of transparent epoxy for example. A light source 33 directs light through the other components of the display 11 and in the present example is an array of light emitting diodes 34 which are bonded to the back of of the support block 31. Other forms of light source 33 may be used or a reflective type of liquid crystal display may be provided by replacing the internal light source 33 with a mirror surface.

Support block 31 is not required in all forms of the invention. Light source 33 may be bonded directly to the back polarizer 17 layer in displays which have no support block 31.

The driver circuit for addressing and energizing busbars 14 and 16 may be of the known type and in this example of the invention is contained on printed circuit boards 36 and 37 which are bonded into conforming recesses 38 in the sides of the support block 31. Thin flexible connectors 39 of the known form which have spaced apart parallel conductive zones 41 are bonded to the sides of the support block 31 and substrate 13 and interconnect circuit boards 36 and 37 and the ends of busbars 14 and 16. The circuit boards 36 and 37 may be bonded to the underside of light source 33 in displays which have no support block 31.

For clarity of illustration, certain components of the flat panel display as depicted in the drawings are fewer in number and have a much greater thickness and greater spacings than is actually the case in the preferred embodiments of the invention. Busbars 14 and 16 and other matrix layers 18, 19 and 24 can be formed as extremely thin films using known photolithic techniques. The liquid crystal layer 12 may typically have a thickness of about 10 microns. Commercially available flexible connectors 39 may have a thickness of about 0.0015 inch. Thin edge seals 29 can be formed with a thickness of about 0.015 inch, using commercially available equipment, at locations where the visible image area is to extend to an edge of the display 11. The number of busbars 14 and 16 and conductive pads 21 per unit area of the substrate 13 may be much larger than can be shown in the drawing in order to provide high resolution images.

When these components of the display 11 have minute configurations and spacings of the above described kind, the visible image as perceived by an observer extends to the edge of the display 11.

By fabrication techniques which will hereinafter be described, minute end portions 42 of the busbars 14 and 16 of the first and second busbar layers remain uncovered by the overlaying layers 18, 19 and 24 of the matrix. Highly reliable electrical connections between the busbars 14 and 16 and the conductive zones 41 of flexible connectors 39 are established by spaced apart busbar extensions 43 which are bonded to the edge surfaces 45 of substrate 13 and which extend away from the planes of the busbars 14, 16 layers at the edge surfaces. The extensions 43, which are preferably formed of sputtered metal, have angled ends 44 which wrap around the intersections of the edge surfaces 35 and the front major surface 50 of the substrate 13 at which the matrix is located. The angled ends 44 extend in parallel relationship with the end portions 42 of busbars 14 and 16 preferably in an overlapping relationship with the busbar end portions. The angled end 44 of each extension 43 which overlaps a busbar 14 or 16 is bonded to the end portion 42 of the adjacent busbar 14 or 16, including at the region of the overlap, to assure good electrical contact. The end portions 42 of the busbars may have a length of about 0.010 inch. Thus the electrical contacts formed by the busbar end portions 42 and angled ends 44 of the extensions 43 can be minute and need not create any bezel region at the boundary of images produced by the display 11 that is of sufficient size to be apparent to a viewer of the image.

The basic operation of the display 11 is similar to that of other displays of the active matrix liquid crystal type. Each conductive pad 21 of the matrix layer 19 defines a separate pixel or picture element of the image. Light from source 33 is diffused, by support block 31 in this instance, and passes through back polarizer 17 and substrate 13. The back polarizer 17 and front polarizer 27 have polarization planes that are at right angles to each other. Thus the light cannot pass through the front polarizer 27 unless the polarization plane of the light is changed as it propagates between the two polarizers. Light is caused to pass through the front polarizer 27 at the particular pixels that define a particular image by applying an electrical voltage to the pads 21 that define those pixels. The resulting localized electrical fields between the energized pads 21 and back plane 28 causes the liquid crystal 12 at those locations to effect the necessary changes of light polarization at those locations.

Figure 3:
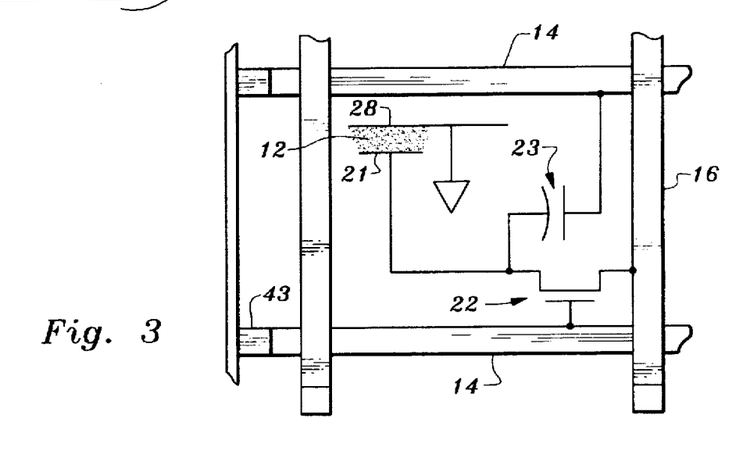
FIG. 3 is a circuit diagram depicting electronic components of an active matrix of the display of the preceding figures.

Referring jointly to FIGS. 2 and 3, circuit board 36 transmits voltage to particular ones of the first layer busbars 14 and board 16 transmits voltage to particular ones of the second layer busbars 16 to energize the pads 21 which are at the locations where the particular ones of the busbars cross each other. For this purpose, each thin film transistor 22 of active matrix layer 19 has a gate connected to the adjacent first layer busbar 14 and a source connected to the adjacent second layer busbar 16. The transistor 22 drain is connected to the adjacent pad 21 and the adjacent storage capacitor 23 is connected across the transistor drain and the following first layer busbar 14. Thus application of voltage to both adjacent busbars 14 and 16 biases the transistor 22 into conduction and thereby charges capacitor 23. The resulting localized electrical field between pad 21 and back plane 28 enables light transmission through the front polarizer 27 at that image pixel in the manner previously described.

Optionally, the inside surface of cover plate 26 may be coated with color filtering material in the manner known to the art to provide a color image. Three adjacent pixels are respectively provided with red, blue and green filtering and the pattern is repeated at each successive group of three pixels in the image. Any desired coloration can be produced at a particular location in the image by energizing a particular one of the pixels or a combination of pixels in the group of three pixels which is at that location in the image.

Figure 4:
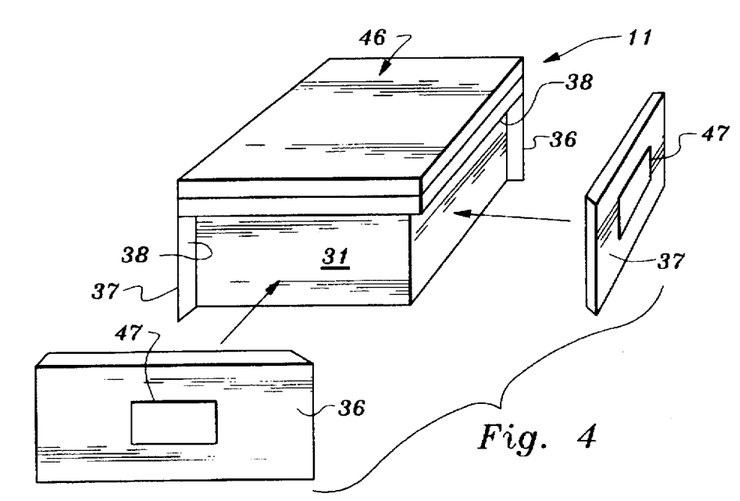
FIG. 4 is an exploded perspective view of the flat panel display of the preceding figures.

Referring to FIG. 4, the driver circuit boards 36 and 37 which seat in conforming recesses 38 in the sides of support block 31 extend along the full length of the image area 46 at least at two intersecting sides of the block. Preferably, there are duplicate boards 36 and 37 at the opposites sides of the block 31 in order to address alternate ones of the busbars at opposite sides of the block.

Figure 5:
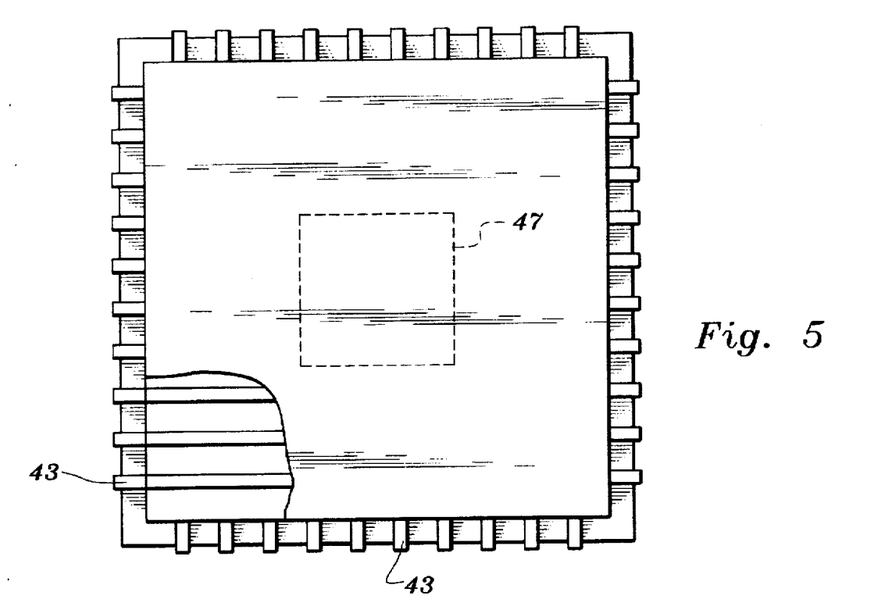
FIG. 5 is a broken out top view of another flat panel display in accordance with a second embodiment of the invention.
Figure 6:
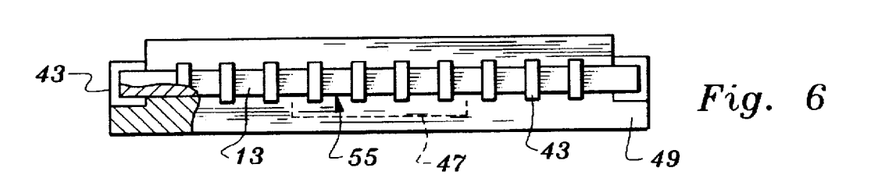
FIG. 6 is a broken out side view of the display of FIG. 5.
Figure 7:
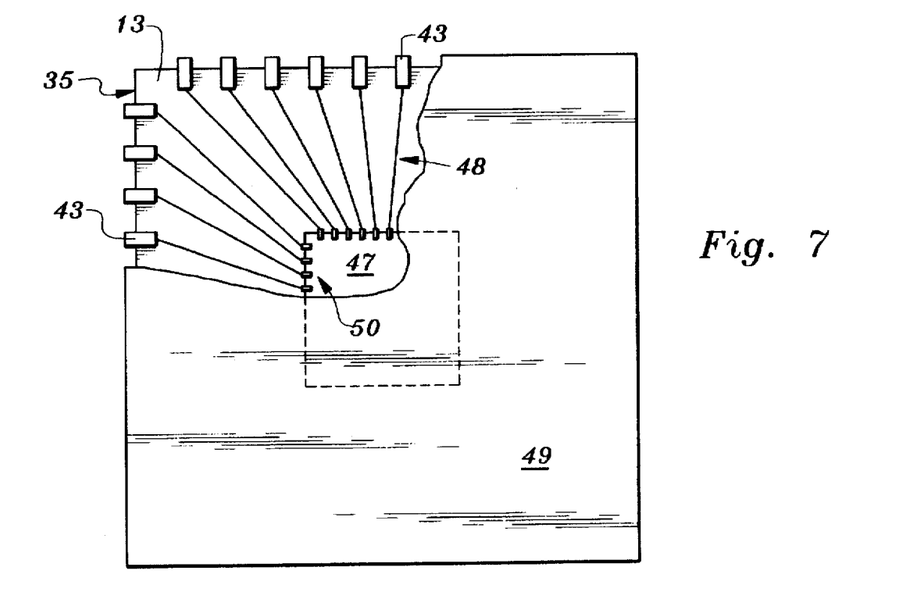
FIG. 7 is a broken out view of the back of the display of FIGS. 5 and 6.

The driver integrated circuit chips 47 in this embodiment, are located away from the image area 46 to enable that area to extend to the edges of the display but are not necessarily at the locations shown in FIG. 4. Referring jointly to FIGS. 5, 6 and 7, a driver IC chip 47 for both layers of busbars may be bonded to the back of substrate 13. In this embodiment, the busbar extensions 43 are further angled to wrap around the intersection of the edge surfaces 35 of substrate 13 and the back edges of substrate 13 and to thereby overlap the back major surface 55 of the substrate at spaced apart locations along the edges of the substrate. Conductive traces 48, patterned onto the back of the substrate 13, fan-in to connect each busbar extension 43 to the IC chip 47. The traces 48 may be electrically connected to the input/output pads 50 of the chip 47 by any of various techniques such as by wire bonding or by solder bumps for example. The side of the chip 47 at which the pads 50 are situated faces away from substrate 13 if the connections are made by wire bonding and faces the substrate if solder bumps are used. The IC chips 47 and traces 48 are covered by a protective layer 49 of polymer sealant or the like.

Figure 8A:
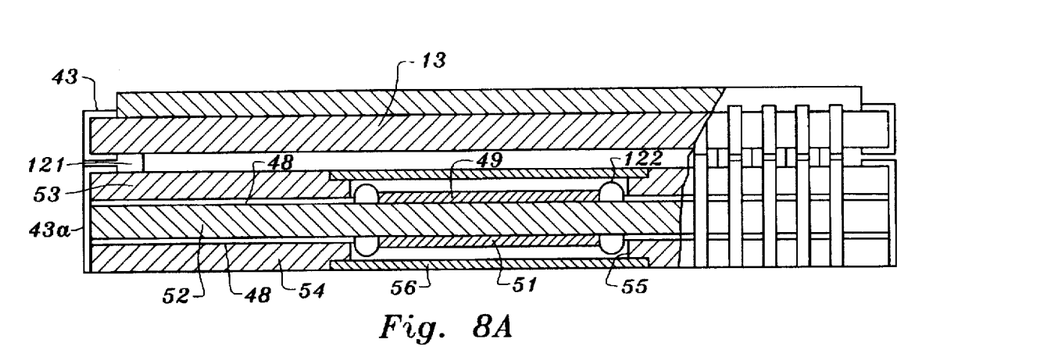
FIG. 8A is a broken out side view of another flat panel display embodying the invention.

Alternately, as shown in FIG. 8A, separate IC chips 49 and 51 for driving each layer of busbars may be on opposite sides of a printed circuit board 52 which is disposed behind substrate 13 and which is situated between two insulative boards 53 and 54, the boards 52, 53 and 54 being parallel to the substrate and being bonded thereto. IC chips 49 and 51 extend into openings 55 in the insulative boards 53 and 54 which openings are hermetically sealed by cover plates 56. Solder bump connections 121 connect the busbar extensions 43 with additional busbar extensions 43a which wrap around the top edge of the upper insulative board 53 and which extend down across the edges of the three boards 52, 53 and 54. Fan-in conductive traces 48 of the previously described kind on opposite faces of circuit board 52 connect the additional busbar extensions 43 with the driver IC chips 49 and 51 through wire bonds 122.

Figure 8B:
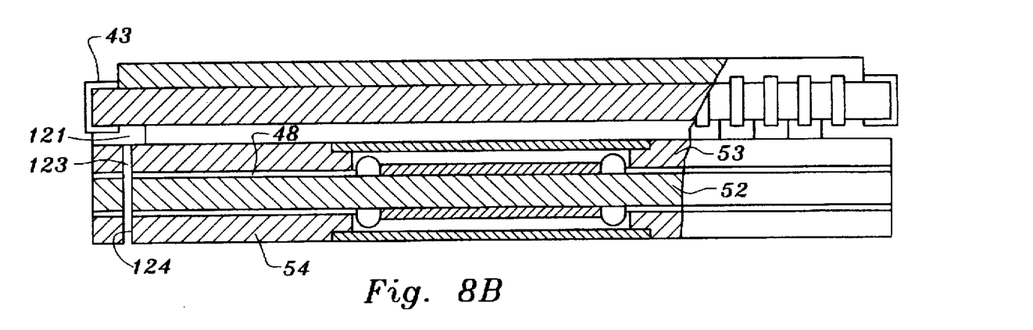
FIG. 8B is a broken out side view of a modified form of the flat panel display of FIG. 8A.

The embodiment of FIG. 8B is similar to that of FIG. 8A except that the additional busbar extensions are not present. Conductors 123 within passages 124 in boards 52, 53 and 54 connect the fan-in traces 48 directly to busbar extensions 43 at solder bump connections 121.

Figure 9:
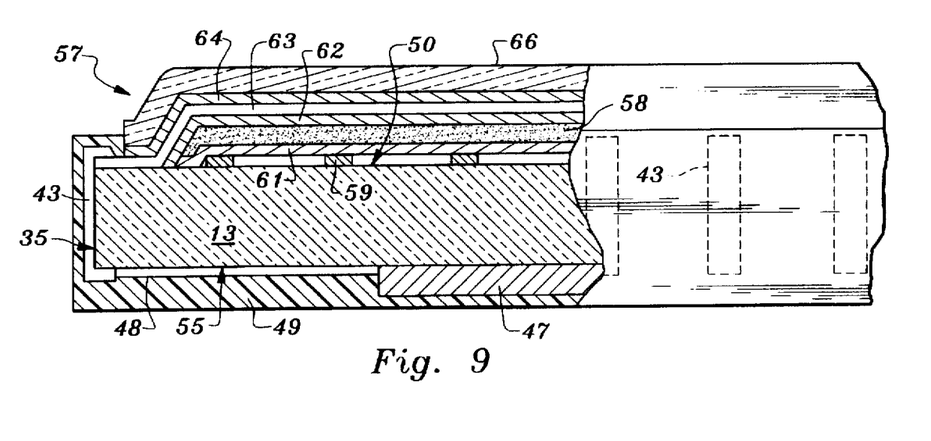
FIG. 9 is a broken out side view of still another flat panel display embodying the invention.

As has been pointed out, wrap around busbar extensions of the above described kind can adantageously be provided in other types of flat panel display that have different optically active material and different matrix layers. FIG. 9 depicts another example of the invention as embodied in a flat panel display 57 which is of the passive matrix electroluminescent type.

The optically active material 58 in a display of this type is a layer of phosphor which emits light at any point at which a localized electrical field is present. The first layer of busbars 59 is again bonded directly to the front surface 50 of substrate 13 and is overlaid by a first layer of insulation 61 and a second insulation layer 62. The phosphor optically active material 58 is situated between the two insulation layers 61 and 62. The second layer of orthogonal busbars 63 in this type of display overlays the second insulation layer 62 and is itself overlaid by a passivation layer 64. A transparent cover plate may be provided as in the previously described embodiment but in this example in which the optically active material 58 is a solid the passivation layer 64 is covered by an outer layer 66 of transparent polymer sealant.

All of the above described matrix layers other then the busbar layers 59 and 63 terminate a minute distance short of the edges of substrate 13. The edges of the optically active layer 58 may, for example, be from 10 to 30 mils from the edges of the substrate. This does not create any significant bezel region at the boundary of the image. This construction allows the ends of the busbars 63 of the second busbar layer to be angled towards the front surface of substrate 13 and to extend along that surface to the edges of the substrate in order to connect with angled busbar extensions 43 which in this example are of the previously described form which wrap around the intersections of the substrate edge surfaces 35 and back major surface 55 in order to overlap the back surface of the substrate. The driver circuit board 47 is bonded to the back surface 55 of the substrate and fan in conductive traces 48 on the back surface connect the circuit board with the busbar extensions 43 in the manner previously described with reference to FIGS. 5, 6 and 7.

Figure 10A:
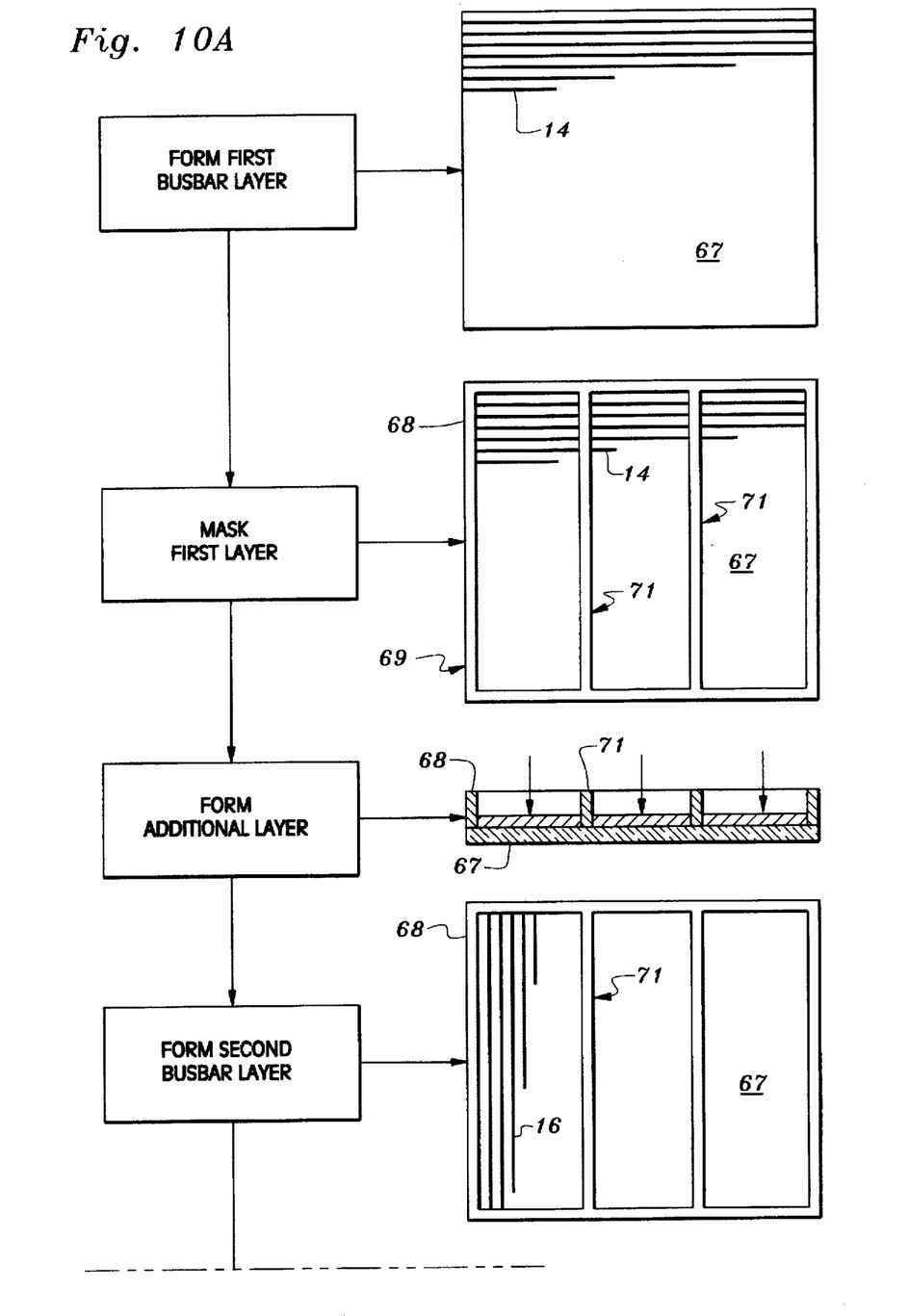
FIGS. 10A, 10B, 10C and 10D diagramatically depict successive steps in a method of creating flat panel displays.
Figure 10B:
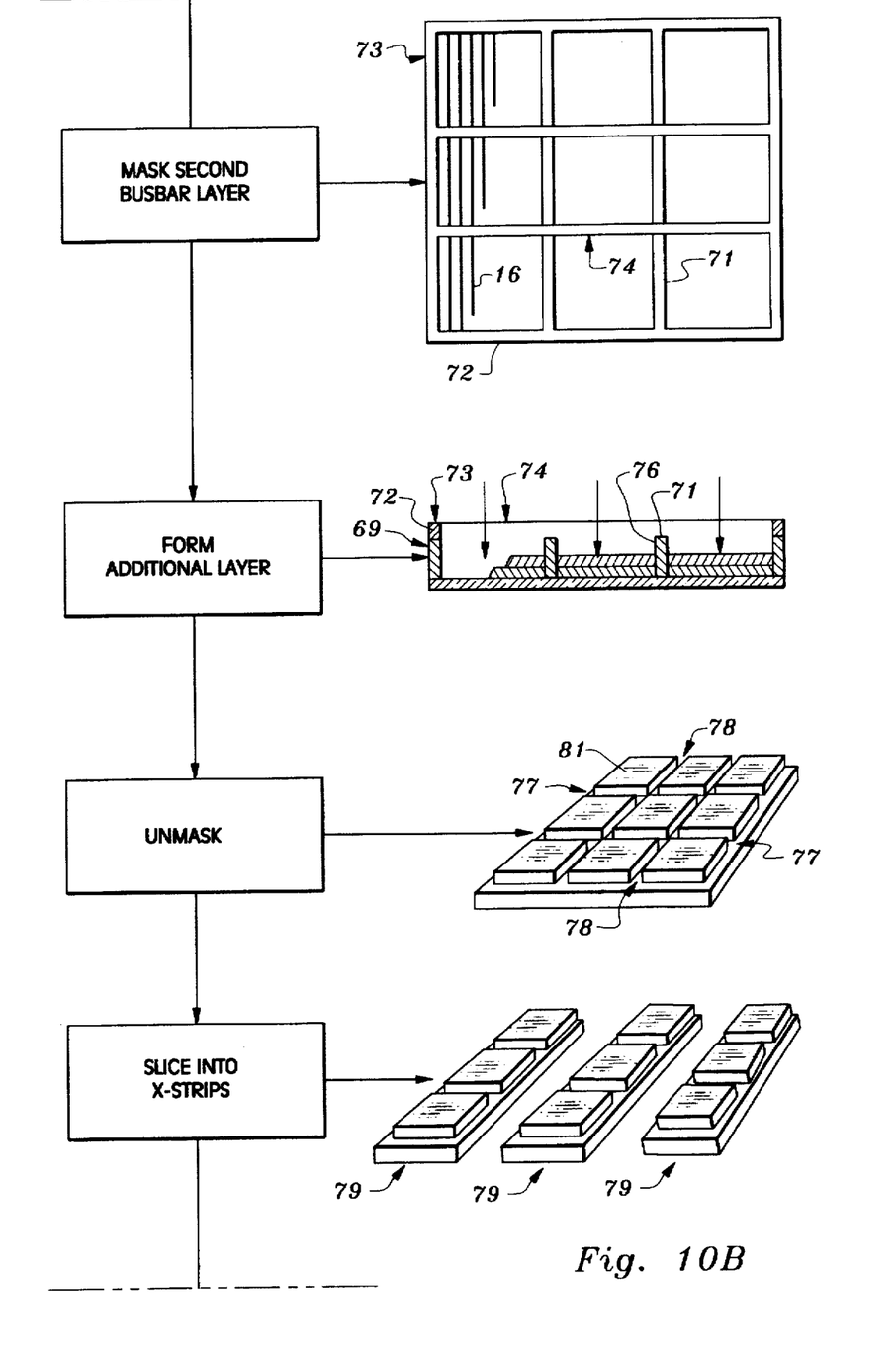
Figure 10C:
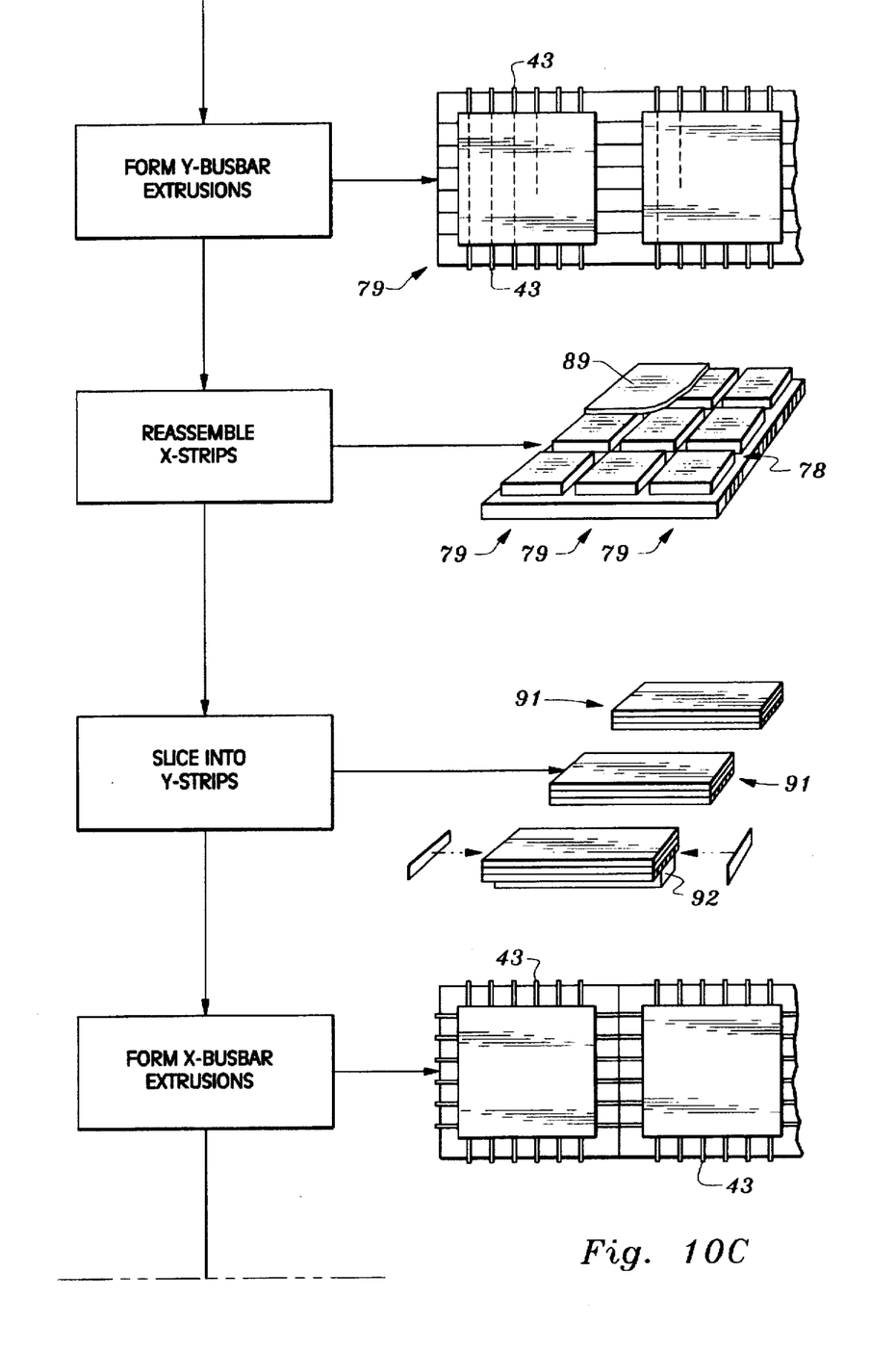
Figure 10D:
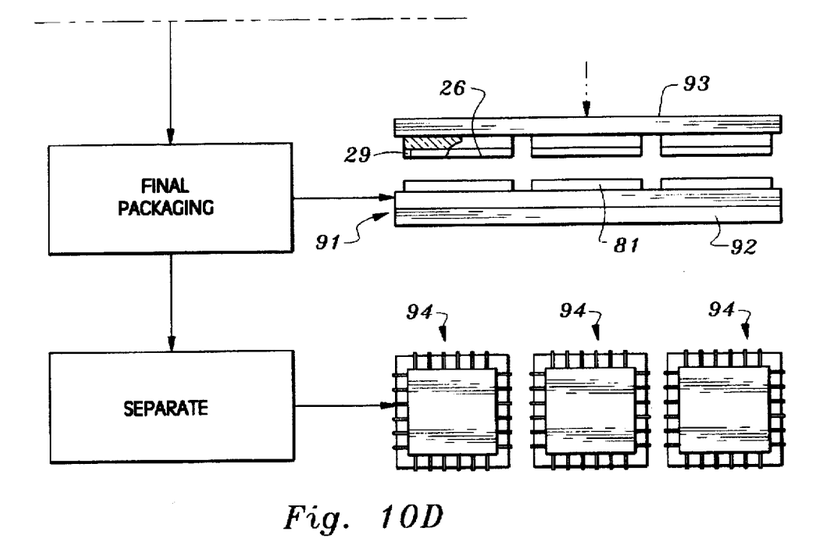
Figure 11:
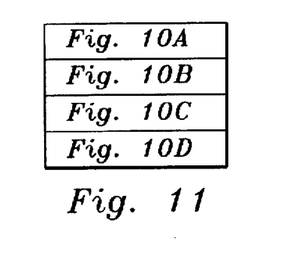
FIG. 11 illustrates how FIGS. 10A to 10D may be juxtaposed in a vertical column to form a single continuous process diagram.

FIGS. 10A to 10D, which may be juxtaposed as shown in FIG. 11 to form a single continuous process diagram, depicts steps in a method of manufacturing flat panel displays that enables fabrication of the wrap around busbar extensions after one or more overlaying matrix layers have already been deposited. The method also enables certain steps of the fabrication process to be performed concurrently on a plurality display units rather than fabricating each display individually thereby effecting substantial cost savings.

Referring initially to FIG. 10A, the busbars 14 and 16 of the first and second layers in effect define an x-y coordinate system. The busbars 14 of the first layer will be herein termed the x-busbars and the second layer busbars 16 will be termed the y-busbars. These arbitrary designations are for convenience of description and should not be understood to mean that the x-busbars 14 necessarily extend in a horizontal directions nor that the y-busbars are necessarily vertical.

Steps in the fabrication process include patterning the x-busbars 14 of the first busbar layer on a cleaned substrate plate 67 which operation may be performed in the known manner such as by forming conductive traces on a glass plate, indium-tin-oxide being the preferred conductive material in instances where the busbar layer is to be light transmissive. The traces may be formed of copper or other conductive opaque metal in forms of display in which the busbars need not be light transmissive.

The substrate plate 67 has an area at least equal to the combined areas of the substrates of the plurality of individual display units that are to be produced. For purposes of example, the method is depicted as providing for joint manufacture of nine display units. A smaller or much greater number of units can be fabricated in essentially the same manner. As an example, 711 small displays suitable for use as keyboard keycaps can be prepared from a substrate plate 67 measuring 14 inches by 14 inches. The resulting key caps are square and measure 0.500 inch along each side. The key caps may have an active image area measuring 0.490 by 0.490 inches.

A stencil mask 68 is then seated on the substrate plate 67 over the x-busbars 14 to mask a series of narrow, parallel aisles or zones which extend across those busbars in the y direction. The mask 68 has a rectangular frame 69 which overlays the margins of the substrate plate 67 to define the outermost of the masked zones and a series of linear ribs 71 which extend between opposite sides of the frame to define the other masked zones. The ribs 71 and thus the masked zones may, for example, have a width of 0.045 inch.

Following the above described masking step, additional material is deposited in the known manner. This may include build up of one or more layers depending on the particular type of flat panel displays that are being fabricated.

Mask 68 remains in place while the y-busbars 16 of the second busbar layer are being patterned. Thereafter, with reference now to FIG. 10B, an additional mask 72 is seated on the first mask 68. The additional mask 72 has a frame 73 conforming in outline with the frame 69 of the first mask 68 and has spaced apart parallel ribs 74 which extend in a direction that is orthogonal to the direction of the ribs 71 of the first mask. Ribs 74 of the additional mask 72 have notches 76 which receive the upper ends of the ribs 71 of the first mask 68. This allows the ribs 74 of the additional mask 72 to seat against the y-busbar 16 layer.

Depending on the type of flat panel displays that are being fabricated, one or more additional layers of the displays may then be built up while both masks 68 and 72 remain in place. Some forms of flat panel display do not require deposition of additional material over the second layer of busbars 16 prior to formation of the busbar extensions. The additional mask 72 may not be needed in the fabrication of such displays.

The stencil masks 68 and 72 are then removed from the substrate plate 67. This leaves a first set of aisles or zones 77 in the layer or layers which are above the y busbars 16. The zones extend in the x direction and thus segments of the y-busbars 16 are uncovered and exposed at the zones. A second set of aisles or zones 78 extend in the y-direction and leave segments of x-busbars 14 exposed.

The substrate plate 67 is then sliced into strips, which will be termed x-strips 79, along the center lines of zones 77. This may be done with a diamond slicing or dicing wheel of the known type which makes the cuts sequentially and which automatically indexes to successive slice zones. The layered material 81 is covered with a polymer coating of one to two microns thickness prior to slicing of the substrate plate 67 to protect the material from contamination arising from the coolant that is used during diamond wheel cutting of brittle material such as glass. The coating is removed with a solvent following the slicing operation.

Figure 12:
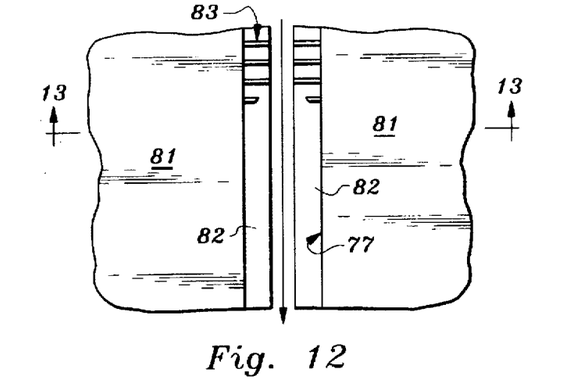
FIG. 12 is a plan view of portions of a plurality of flat panel displays at an intermediate stage of manufacture.
Figure 13:
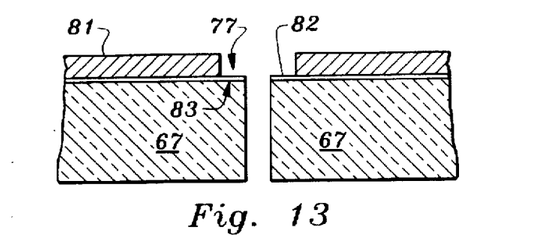
FIG. 13 is a cross section view taken along line 13—13 of FIG. 12.

Referring jointly to FIGS. 12 and 13 which depict a portion of one of the zones 77 after slicing, the cutting operation is performed with a dicing wheel that has a thickness that is smaller than the width of the aisle. Consequently, ledges 82 extend along each side of each of the x-strips 79 at which end portions 83 of the y-busbars are exposed. A typical dicing wheel has a thickness ranging from 0.020 to 0.030 inch. The kerf loss, i.e. the material removed by the wheel as it slices through the substrate, is about 0.002 to 0.003 inch wider than the wheel thickness. For example, if the wheel is 0.020 inch wide the final width of the cut will be about 0.025 inch wide. Ledges 82, which provide busbar contact area for wrap around busbar extensions, are then 0.010 inch wide if the aisle 77 has a width of 0.045 inch as previously described.

Alternately, the slicing step may be performed by the scribe and break procedure for cutting glass. This leaves very sharp edges which can adversely affect formation of good electrical connections to the busbars. The problem may be avoided by chamfering the sharp edges, to provide an 0.002 inch chamfer for example, with a precision grinding machine.

Referring to FIG. 10C, angled busbar extensions 43 for the y-busbars are then formed along the sides of each x-strip 79 by any of several techniques. For example, with reference to FIG. 14, the x-strip 79 may be rinsed and dried and then be placed in a stencil mask fixture 84 which has slotted side walls 86. The vertical slots 87 in the stencil mask side walls are each at the location of a busbar extension which is to be formed and have a width similar to the width of the busbars. Within the sputtering chamber, metal is deposited on the sides of the substrate plate 67 at the location of the slots. Owing to the inherent throwing power of a sputtering process, the metal deposit extends inward from the fixture side walls 86 and overlaps and bonds to the exposed end portions of of the busbars at the ledges 82.

Figure 14:
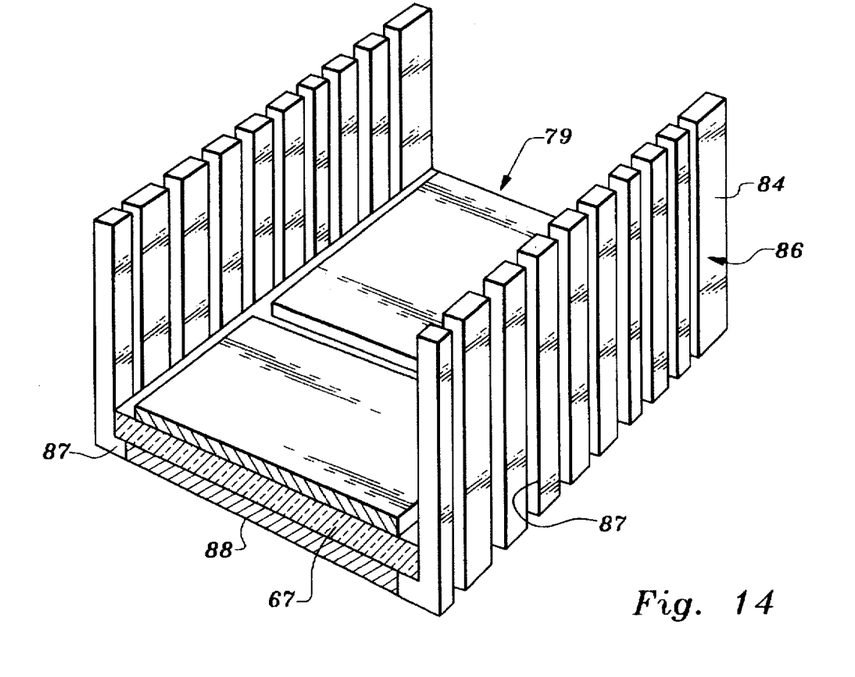
FIG. 14 is a diagramatic perspective view of a portion of a stencil mask that is used in the method of FIGS. 10A to 10D.

The stencil mask 84 depicted in FIG. 14 is used for forming busbar extensions of the type previously described with reference to FIGS. 5 to 9 which busbar extensions wrap around the substrate edge surfaces and overlap both major surfaces of the substrate. For this purpose, the slots 87 of the stencil mask fixture 84 extend into the floor 88 of the fixture and are angled inward to extend a short distance under the adjacent portions of the substrate 67. This causes the metal deposit to overlap both of the top and bottom surfaces of the substrate 67. The lower ends of the stencil mask slots 87 need not be angled inward in this manner if the busbar extensions 43 are of the form shown in FIGS. 1 and 2 which extensions overlap only the front major surface 50 of the substrate.

Figure 15A:
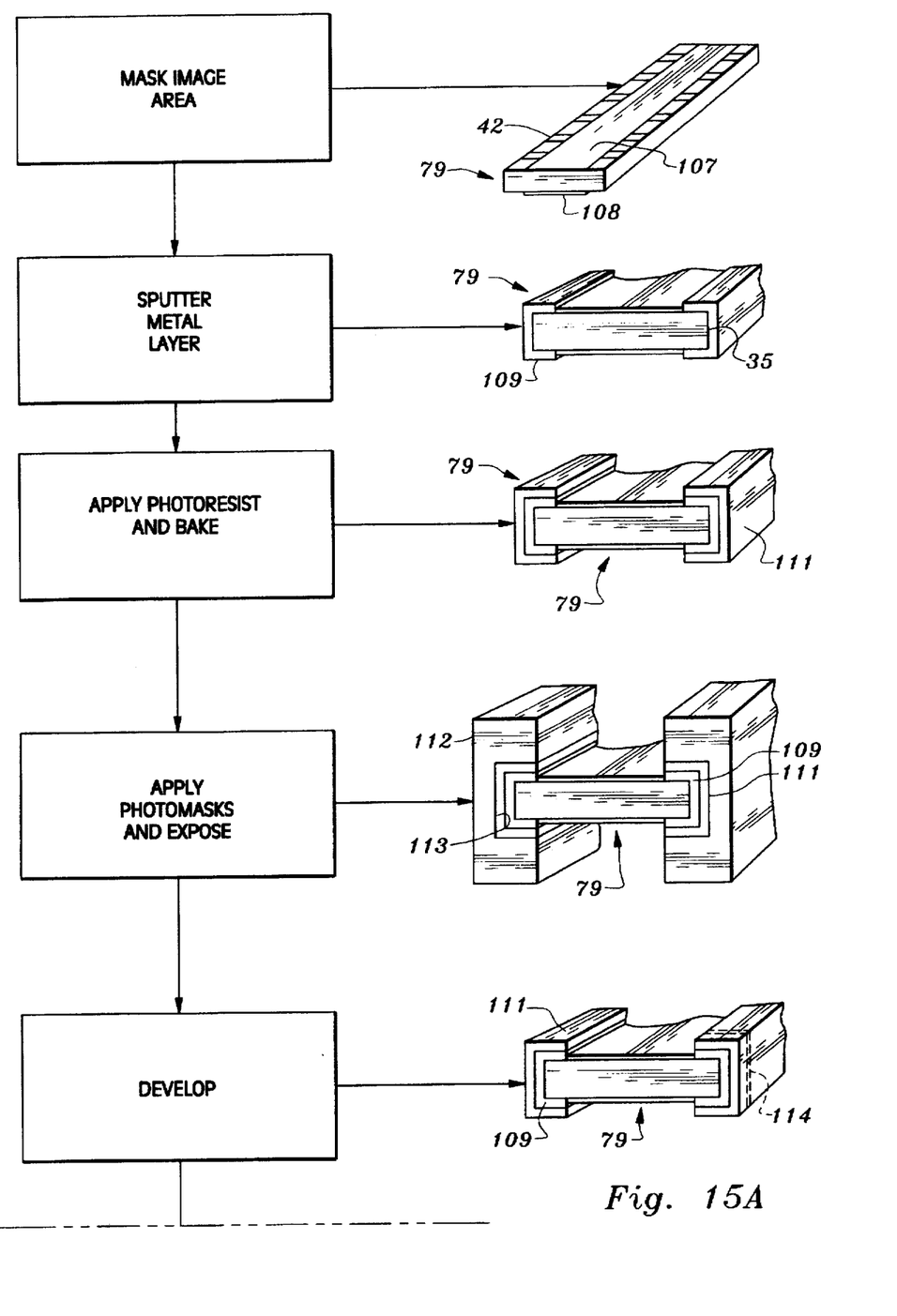
FIGS. 15A and 15B jointly depict successive steps in an alternate process for forming busbar extensions in a method which may otherwise be similar to the method of FIGS. 10A to 10D.
Figure 15B:
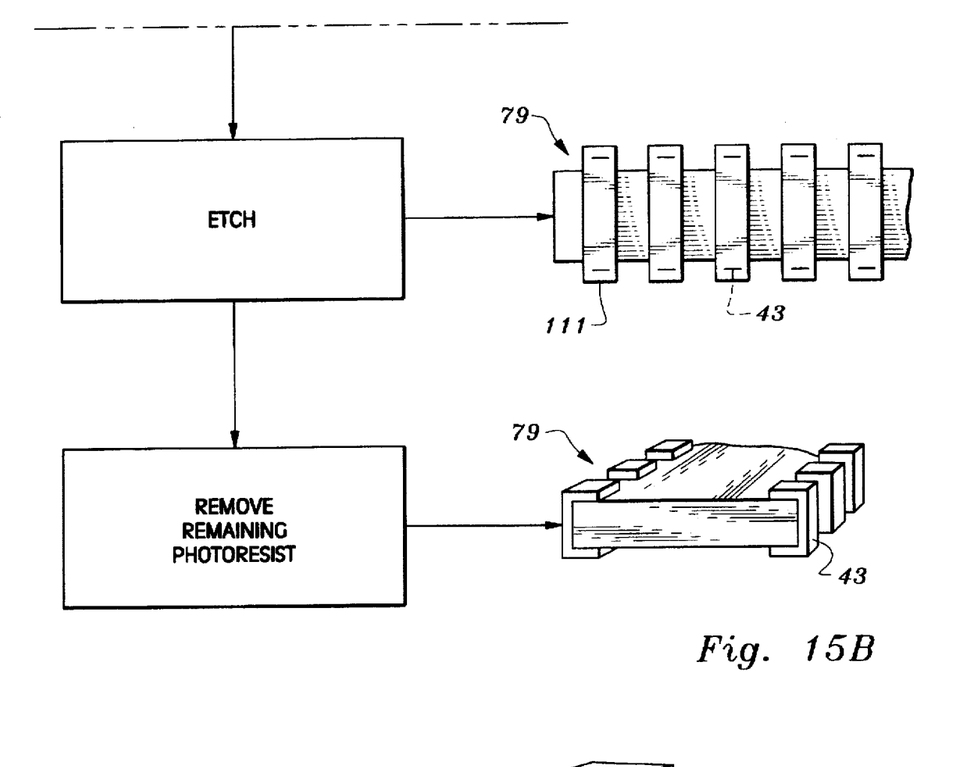

FIGS. 15A and 15B jointly depict an alternate procedure for forming the busbar extensions by a subtractive etching process. Initially, the image area at the front surface of the x-strip 79 is covered with a mask 107 leaving only minute end portions 42 of the y-busbars in an exposed condition. The back surface of the x-strip is masked in a similar manner with a mask 108 which leaves thin marginal regions of the back surface exposed if the busbar extensions 43 are to be of the type which overlap both the front and back surfaces of the substrate. A layer 109 of conductive metal is then deposited on the edge surfaces 35 and the exposed areas of the front and back surfaces of the x-strip 79, preferably by a sputtering operation.

Figure 16:
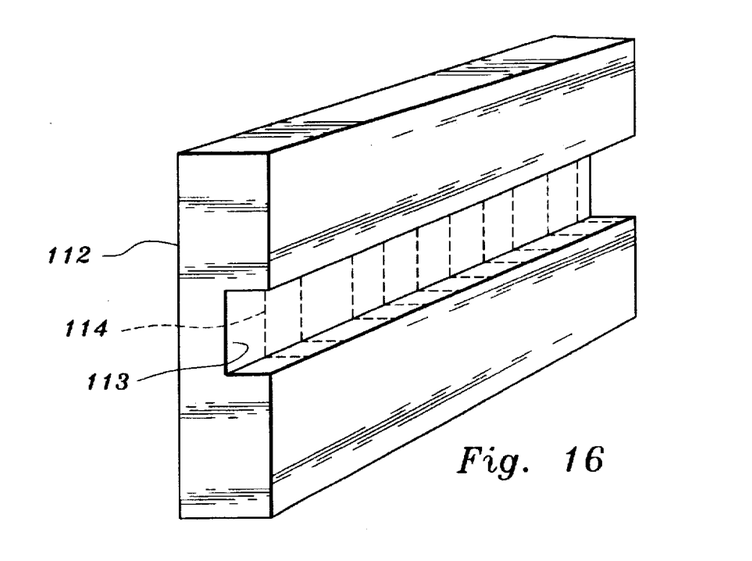
FIG. 16 is a diagramatic perspective view of a portion of a photomask that is used in the process of FIGS. 15A and 15B.

A layer 111 of photoresist is applied over the metal layer 109 and is baked. Photomasks 112 are then positioned along the sides of the x-strip 79 which photomasks each have a longitudinal groove 113 into which an edge of the x-strip is fitted. As shown in FIG. 16, the photomasks 112 have opaque traces 114 within the grooves 113 which wrap around the sides of the x-strip and which have a configuration conforming with the configuration of the busbar extensions 43 that are to be formed. The traces are spaced apart and are at the locations of the busbar end portions 42 which the extensions are to connect with.

The photoresist 111 is then exposed to ultraviolet light and developed. Areas of the photoresist 111 that are masked by the opaque traces 114 during the exposure remain after a solvent is used to remove the other portions of the photoresist. The etching fluid dissolves metal that is not covered by the remaining photoresist. After etching, the remaining photoresist is removed from the remaining metal which forms the busbar extensions 43.

Referring again to FIG. 10C, after formation of the y-busbar extensions 43, the x-strips 79 are reassembled by placing the strips in side-by-side relationship on a vacuum chuck which holds the strips in this relationship. A thin glass plate 89 is then wax bonded to the top surface of the reassembled strips 79. The reassembled strips 79, including plate 89, are then resliced into strips along the center lines of the y-direction zones 78 which extend transversely on the x-strips 79. The slicing operation may be performed with a diamond slicing wheel in the previously described manner and produces what will be termed y-strips 91.

The y-strips 91 are rinsed and dried. Clamping pressure is applied to each end of each strip 91, before the strips are removed from the vacuum chuck, to hold each strip together. The strips 91 are heated to enable removal of the cover plates 89 and are solvent cleaned to remove the wax which bonded the plates to the strips. The y-strips 91 are then re-heated and a glass plate 92 is wax bonded to the underside of each y-strip. Plates 92 have a length equal to the length of the y-strips 91 and a width which is about 20% smaller than the width of the strips. The y-strips 91 are then cooled and the clamps are removed.

Angled busbar extensions 43 for the x-busbars 14 are then formed along each side of each y-strip 91 by a sputtering procedure or a sputtering and etching procedure similar to the operations that have been previously described.

Referring to FIG. 10D, final packaging of the display units may then proceed and will vary depending on the particular type of flat panel display that is being produced. This includes formation of any matrix layers, optically active layers, coverings or the like that have not already been formed. If, for example, the displays are of the type previously described with reference to FIGS. 1 and 2 then final packaging may include bonding of the cover plates 26 and thin edge seals 29 to the matrix layers 81 and filling of the space between the cover plate and matrix with the liquid crystal. The latter operation can be performed after the cover plates 26 and thin edge seals 29 are in place by standard vacuum filling procedures. A small gap in the edge seal 29 enables inflow of the liquid crystal after which the gap is sealed with epoxy or the like. Alternately, a small hole in the cover plate 26 enables the inflow and is sealed with transparent epoxy after the filling step. Final packaging of displays of the type previously described with reference to FIG. 9 may include depositing of the passivation layer 64 and polymer sealant layer 66 if these have not been previously applied.

The final packaging operations can be performed on an individual unit basis but it is advantageous to package the units in each y-strip 91 concurrently. Handling, orientation and alignment of small individual parts is minimized. If, for example, the displays are of the type previously described with reference to FIGS. 1 and 2 this may be effected by temporarily adhering the cover plates 26 with edge seals 29 to a backing strip 93 which enables simultaneous emplacement and simultaneous bonding of these components to each display unit of the y-strip 91. Plates 92 and backing strips 93 are then removed and the y-strips 91 are separated into individual flat panel displays 94.

In the method as described above, one or more masks 68, 72 are used to create the aisles or zones 77, 78 along which the substrate plate 67 is divided into smaller units. Alternately, one or more of the additional layers may be deposited on the busbars without making use of such masks. The zones 77, 78 at which short portions of the busbars are exposed may then be formed by removing the additional layer material that has been deposited at the locations of the zones. This may be accomplished in any of several ways.

The additional layer material at the zones 77, 78 may, for example, be removed by an etching process similar to that which has been described above by using an etching fluid which does not attack the material that the busbars are formed of. Alternately, areas of the additional layer material that are not to be removed may be masked and the portions of such material that are at the zones 77, 78 may be removed by sandblasting or the additional layer material at the zones may be burned away with a laser beam or be ground away with a grinding wheel.

Figure 17:
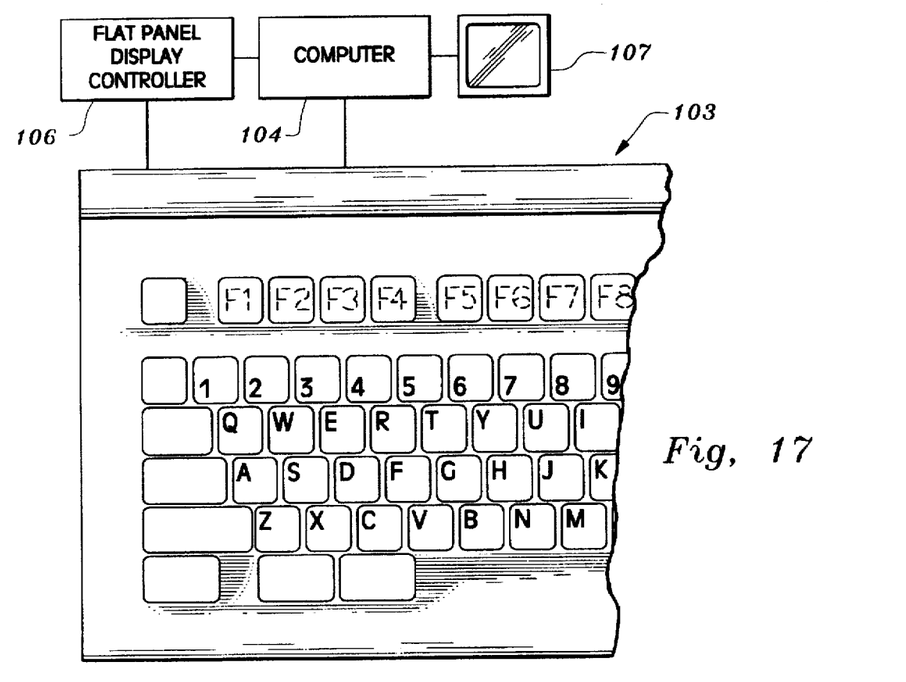
FIG. 17 is a plan view of a portion of a computer keyboard having flat panel displays with edge to edge image areas which form the key caps for multi-function keys.

Flat panel displays in accordance with the invention can be of any size but are particularly useful where small displays are needed as the edge to edge image area enables display of larger images than can be presented at a display which has an image area surrounded by an inactive bezel region. For example, with reference to FIG. 17, a keyboard 103 of a computer 104 has a number of multipurpose keys, such as function keys F1 to F8, that are used for different purposes when running different programs. These keys in prior keyboards have a permanently imprinted, unchangeable label. The keyboard shown in FIG. 17 for example is of the IBM (TM) type and as currently marketed the successive function keys are permanently imprinted with the labels F1, F2, F3 etc. The operator memorizes the different actual functions that are initiated by these keys when different programs are run. This complicates the process of learning to use the computer and can cause errors to be made by experienced operators.

Figure 18:
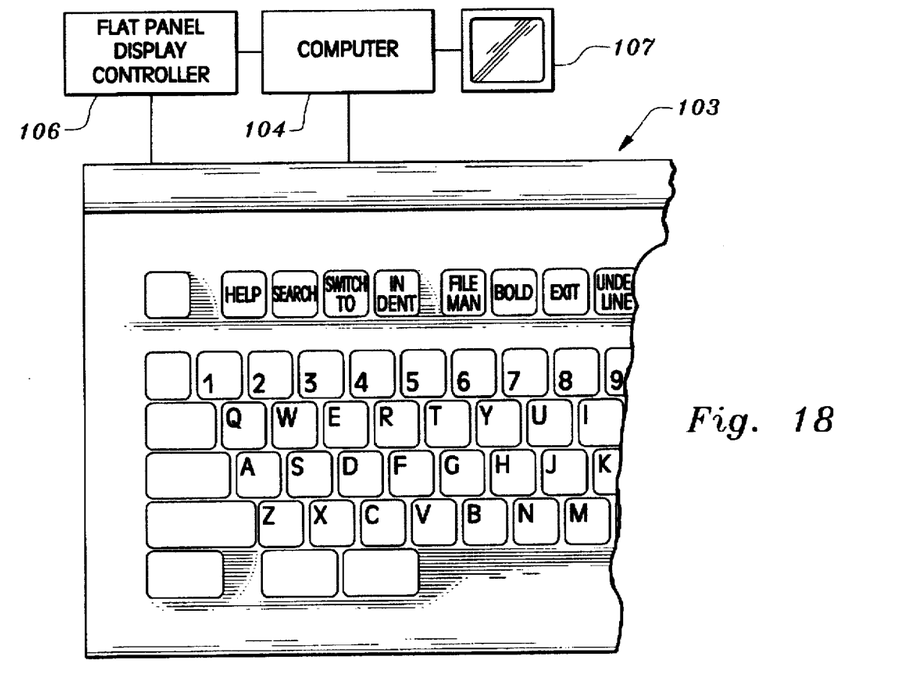
FIG. 18 depicts the appearance of the keyboard of FIG. 17 during an alternate mode of operation.

By replacing the permanently imprinted function keys with flat panel display key caps F1 to F8 of the hereinbefore described kind, the keys can be caused to display labels or symbols which identify the current functions of the keys and which, as shown in FIG. 18, change instantly when a program which designates different functions for the keys is entered into the computer 104. A display controller 106 of standard design can be coupled to the computer 104 and to the key caps F1 to F8 to generate the changeable images at the key cap displays. Connection of the display controller 106 to the previously described driver circuits, which are components of the key caps F1 to F8, may be made through flexible conductors (not shown) to accommodate to the movement of the key caps which occurs during operation.

While the invention has been disclosed with respect to certain specific embodiments for purposes of example, many modifications and variations are possible and it is not intended to limit the invention except as defined in the following claims.

We claim:

1. A flat panel display having a substrate with first and second opposite major surfaces and an edge surface which extends therebetween, said display further having a first layer of busbars that extend in parallel relationship with said first major surface of said substrate and which extend to said edge surface thereof and a second layer of busbars which extend in parallel relationship with said first major surface and which are oriented to cross the busbars of said first layer thereof, said display further having driver circuitry and a layer of optically active material that generates visible images in response to signals that are applied to the busbars by said driver circuitry, wherein the improvement comprises:

a plurality of spaced apart conductive busbar extensions for separately connecting individual busbars to said driver circuitry including a series of spaced apart busbar extensions at said edge surface of said substrate which connect busbars of said first layer thereof with said driver circuitry, wherein the busbar extensions of said series extend away from the plane of said first major surface of said substrate and extend towards said second major surface thereof at said edge surface thereof and have first major surface overlapping angled first ends which wrap around the intersection of said edge surface and said first major surface and extend for a distance along end portions of said busbars of said first layer in electrical contact therewith and which are bonded thereto.

2. The flat panel display of claim 1 wherein said angled first ends of said busbar extensions overlap said end portions of said busbars and wherein said end portions of said busbars and the overlapped angled first ends jointly form bodies of conductive material that are thicker than the portions of said busbars that are away from said edge surface of said substrate.

3. The flat panel display of claim 1 wherein said angled first ends of said busbar extensions overlap said end portions of said busbars and wherein said end portions of said busbars and the overlapped angled first ends jointly form bodies of conductive material that are wider than the portions of said busbars that are away from said edge surface of said substrate.

4. The flat panel display of claim 1 wherein each of said busbar extensions is an angled integral body of metal which wraps around the intersection of said edge surface and said first major surface.

5. The flat panel display of claim 1 wherein said angled first ends of said busbar extensions and said end portions of said busbars are overlaid by insulative material.

6. The flat panel display of claim 1 wherein the busbars that are connected to said series of busbar extensions extend completely across said substrate.

7. The flat panel display of claim 1 wherein said first and second layers of busbars and said layer of optically active material are substantially coextensive with said substrate.

8. The flat panel display of claim 1 wherein said edge surface of said substrate is a first edge surface thereof and said series of busbar extensions is a first series of busbar extensions, said substrate having a second edge surface which extends away from said first edge surface and wherein said busbars of said second layer thereof extend across said across said substrate to said second edge surface, further including a second series of busbar extensions disposed at said second edge surface wherein busbar extensions of said second layer thereof extend away from the plane of said first major surface at said second edge surface and have angled first ends which wrap around the intersection of said second edge surface and said major surface and extend for a distance along end portions of said busbars of said second series thereof in electrical contact therewith and which are bonded thereto, the busbars of said second series thereof being electrically connected to said driver circuitry.

9. The flat panel display of claim 1 wherein said first major surface is a front surface of said substrate and said second major surface is a back surface thereof, wherein said driver circuitry is situated behind said substrate and wherein said busbar extensions extend to said back surface at said edge surface of said substrate and have second angled ends which wrap around the intersection of said back surface and said edge surface, further including conductive means for interconnecting said second ends of said busbar extensions and said driver circuitry at the back of said substrate.

10. The flat panel display of claim 9 wherein said driver circuitry includes an integrated circuit bonded to the back of said substrate and wherein said conductive means includes a plurality of conductive traces patterned onto said second major surface of said substrate and extending from said integrated circuit to said second angled ends of said busbar extensions.

11. The flat panel display of claim 9 wherein said driver circuitry includes a circuit board situated at the back of said substrate and extending in parallel relationship therewith, a first integrated circuit which is connected to ones of said busbar extensions that are connected to the busbars of said first layer thereof and a second integrated circuit which is connected to ones of said busbar extensions that are connected to the busbars of said second layer thereof, said first and second integrated circuits being on opposite sides of said circuit board.

12. The flat panel display of claim 9 wherein said driver circuit includes a integrated circuit bonded to the back of said substrate and said conductive means includes a plurality of conductive traces patterned onto the back of said substrate and which fan out from said integrated circuit to individual ones of said second ends of said busbar extensions.

13. The flat panel display of claim 1 further including a support block disposed behind said substrate and being bonded thereto, said support block having a length and width of which conforms substantially with the length and width of said substrate and having a recess situated behind said edge surface of said substrate, said driver circuitry having a first circuit board which is disposed in said recess, and a ribbon like film connector extending along said edge surface of said substrate and extending to said circuit board, said film connector being an insulative film which has a series of spaced apart conductive paths which electrically connect the busbar extensions of said first series thereof to said circuit board.

14. A switch cap comprising:

a flat panel display having a substrate with a first major surface and an opposite major surface and an edge surface which extends therebetween, a first layer of busbars that extend in parallel relationship with said first major surface of said substrate and which extend to said edge surface thereof, a second layer of busbars which extend in parallel relationship with said first major surface and which are oriented to cross the busbars of said first layer thereof, a layer of optically active material that generates visible images in response to signals that are applied to the busbars, which optically active material overlays said substrate, a flat panel display driver circuit situated at the opposite major surface of said substrate, a plurality of spaced apart conductive busbar extensions at said edge surface of said substrate which connect busbars of said first layer thereof with said driver circuit, wherein the busbar extensions of said series extend towards said opposite major surface of said substrate at said edge surface thereof and have angled first ends which wrap around the intersection of said edge surface and said first major surface and extend for a distance along end portions of said busbars of said first layer thereof in electrical contact therewith and which are bonded thereto.

* * * * *